3,238,198
METHINE DYESTUFFS
Roderich Raue and Ernst-Heinrich Rohe, Leverkusen, Germany, assignor to Farbenfabriken Bayer Aktiengesellschaft, Leverkusen, Germany, a corporation of Germany
No Drawing. Filed Mar. 12, 1962, Ser. No. 179,244
Claims priority, application Germany, Mar. 27, 1961, F 33,519
11 Claims. (Cl. 260—240)

The invention relates to novel dyestuffs; more particularly it relates to dyestuffs which in the cationic state correspond to the formula

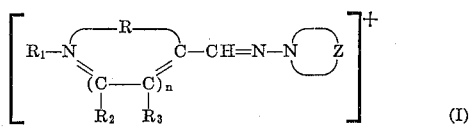

(I)

In this formula $n$ means 0 or 1, R stands for a divalent residue which together with

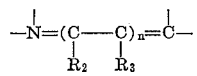

forms a benzthiazole, pyridine, quinoline or acridine ring, $R_2$ and $R_3$ mean hydrogen or, taken together,

$R_1$ stands for hydrogen, lower alkyl or benzyl and Z is a divalent radical which together with the nitrogen atom forms a carbazole, hexahydro-carbazole, piperidine, indoline, tetrahydroquinoline and tetrahydroisoquinoline ring.

The dyestuffs of the Formula I are free of sulfonic acid and carboxylic acid groups; they may however bear in the carbocyclic part of the benzthiazole, quinoline, carbazole, acridine and indoline components as non-ionic substituents lower alkyl, lower alkoxy, chlorine, bromine nitro and optionally substituted sulfonamide groups.

The new dyestuffs are obtained if compounds of the formula

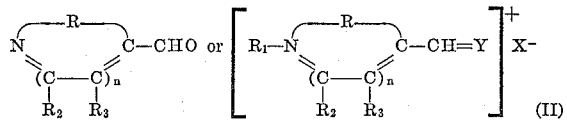

(II)

wherein $n$, R, $R_1$, $R_2$ and $R_3$ have the above significance, Y stands for an oxygen atom or for the radical $=N-R_4$, $R_4$ being an aromatic radical, and wherein X stands for the residue of an acid used for salt formation of basic dyestuffs, are condensed with cyclic hydrazine compounds of the formula

(III)

wherein Z has the same meaning as indicated above, and the cyclic hydrazones thus obtained are transformed, if desired, into the form of salts or are treated in the form of free bases with quaternising agents.

Compounds of the Formula II suitable for the production of the new dyestuffs are, inter alia: quinoline-2-aldehyde, pyridine-2-aldehyde, benzthiazole-2 - aldehyde, 1-methylbenzimidazole-2-aldehyde, benzimidazole-2 - aldehyde, 6-methoxyquinoline-2-aldehyde, 6-chloroquinoline-2-aldehyde, 6-nitroquinoline-2-aldehyde, 8-nitroquinoline-2-aldehyde, pyridine-4-aldehyde, quinoline - 4 - aldehyde, 6-chloroquinoline-4-aldehyde, 6-nitroquinoline - 4 - aldehyde, 8-nitroquinoline-4-aldehyde, acridine-9 - aldehyde, 6-chloroacridine-9-aldehyde, as well as the azomethines obtainable of 1,2-dimethyl-pyridinium iodide, 1,2-dimethylquinolinium bromide, 1,2 - dimethylbenzthiazolium methosulphate, 1,4 - dimethylquinolinium chloride, 6-chloro-1,4-dimethylquinolinium iodide, 6-methoxy - 1,4-dimethylquinolinium methosulphate or 10,9 - dimethylacridinium-methosulphate, with nitroso dialkyl anilines.

Suitable cyclic hydrazine compounds (III) are for example: N-amino-2-methyl-2,3-dihydro indole, N-amino-2-methyl-5-methoxy-2,3-dihydro indole, N - amino - 2,3,3-trimethyl-5-methoxy-2,3-dihydro indole, N-amino-1,2,3,4-tetrahydro quinoline, N-amino-1,2,3,4,5,6-hexahydro carbazole, N-amino carbazole and N-amino piperidine.

If aldehyde compounds are used for the formation of the hydrazones the reaction can be carried out either in absence or presence of a solvent such as alcohol, acetic acid or dilute hydrochloric acid. If azomethines ($Y: =N-R_4$) are used the presence of acids, such as hydrochloric acid, sulphuric acid or phosphoric acid is required. The reaction of the free hydrazone bases with quaternizing agents, such as dimethyl sulphate, diethyl sulphate, 4-toluene sulphonic acid esters, benzylbromide or methyl iodide is preferably carried out in an inert solvent, for example in acetone, ligroin, benzine, benzene, toluene, chlorobenzene or chloroform. In the dyestuffs obtainable according to the invention, customary transformation reactions can subsequently be carried out. For example, acylamino or nitro groups can be transformed in the usual manner into $-NH_2$ groups, for example by saponifying acylamino groups in an aqueous or alcoholic medium at an elevated temperature and in the presence of acids, such as sulfuric acid, hydrochloric acid, phosphoric acid, 4-toluene sulfonic acid or alkyl sulfuric acid, to the free amino groups or by reducing nitro groups in a suitable manner.

The anionic part of the novel dyestuffs is of no influence on the dyeing characteristics; it may be represented by any inorganic or organic acid residue usually appearing in the salt form of basic dyestuffs. The new dyestuffs are suitable for dyeing and printing of a great variety of materials, such as textiles, synthetic fibers, paper or leather. Dyestuffs free of sulfonic acid and carboxylic acid groups yield, particularly on materials, such as foils, filaments, ribbons and the like of polyacrylnitrile as well as of mixed polymerisates of acrylnitrile, dyeings and prints which are distinguished by a very good fastness to light, wet processing to acids and to alkali and to sublimation. These novel dyestuffs which are free of $-SO_3-$ and COOH groups do not draw onto woollen, cotton and viscose rayon fibrous materials. The sulfonic acid and carboxylic acid group free dyestuffs also possess excellent fastness to sublimation when incorporated into a varnish color and applied onto a substrate according to known technics.

The following examples are given for the purpose of illustrating the invention, the parts being parts by weight.

*Example 1*

29.6 parts of N-amino-2-methyl indoline are dissolved in 30 parts of alcohol. 21.4 parts of pyridine-4-aldehyde are added dropwise to this solution, whereby the temperature rises to 68° C. The reaction mixture is now heated to the boil and maintained at this temperature for 3 hours. The mixture is subsequently evaporated and the residue is mixed with 500 parts of hot water and 20 parts of concentrated hydrochloric acid. The dyestuff solution thus obtained is clarified with activated carbon and, after cooling, salted out with sodium chloride. The precipitated dyestuff is separated and washed with a saturated sodium chloride solution; it corresponds to the formula

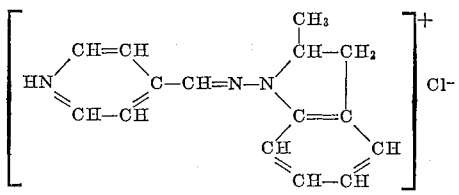

The dyestuff thus obtained dyes textiles materials of polyacrylnitrile a reddish yellow with very good fastness to light, wet processing and to sublimation.

If instead of the pyridine-4-aldehyde the pyridine-2-aldehyde is used and the process otherwise carried out in the same manner, a dyestuff is obtained which also dyes materials of polyacrylnitrile in very fast yellow shades.

*Example 2*

25 parts of the dyestuff obtained by condensation of N-amino-2-methyl indoline and pyridine-4-aldehyde are stirred with 500 parts of water, and the dyestuff solution is rendered to pH 8 by the addition of a 10% sodium carbonate solution, while being cooled with ice. The precipitated dyestuff base is filtered off with suction and washed neutral. After re-crystallisation from cyclohexane it melts at 114–116° C.

13.5 parts of the cyclic hydrazone dyestuff thus obtained are dissolved in 100 parts of toluene, and to 8.8 parts of diethyl sulfate are added dropwise. The reaction mixture is then heated to 100° C. and maintained at this temperature for 6 hours, whereby the alkylated dyestuff crystallises out.

The dyestuff which corresponds to the formula

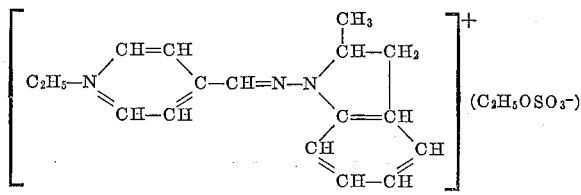

dyes materials of polyacrylnitrile in a reddish yellow of very good fastness to light and wet processing.

If instead of the dyestuff salt from pyridine-4-aldehyde and N-amino-2-methyl indoline the salt of pyridine-2-aldehyde and N-amino-2-methyl indoline is used and the process is otherwise carried out in the same manner, the cyclic hydrazone dyestuff with a melting point at 56–57° C. is first obtained, and by subsequent alkylation in toluene a dyestuff which dyes polyacrylnitrile yarns greenish yellow shades of excellent fastness to light and wet processing; wool if present in the bath at the same time is not dyed.

*Example 3*

9.1 parts of quinoline-4-aldehyde are dissolved with heating in 30 parts of alcohol; into the solution there are introduced 8.6 parts of N-amino-2-methyl indoline. The reaction mixture is brought to the boil and boiled under reflux for 4 hours. On cooling the cyclic hydrazone dyestuff separates in a crystalline form. It is filtered off with suction and recrystallised from alcohol. Its melting point is then 135–137° C.

6.9 parts of this hydrazone are introduced into a boiling mixture of 500 parts of water and 5 parts of concentrated hydrochloric acid. The orange red solution is clarified by the addition of activated carbon, filtered off and the dyestuff is salted out in the filtrate with sodium chloride.

The isolated dyestuff dyes materials of polyacrylnitrile reddish orange shade with very good fastness properties.

If instead of the quinoline-4-aldehyde the quinoline-2-aldehyde is used and the process is otherwise carried out in the same manner the corresponding cyclic hydrazone dyestuff is obtained which, after recrystallisation from alcohol, melts at 93–97° C. The transformation into the dyestuff salt may be carried out as described above. The dyestuff dyes materials of polyacrylnitrile very fast orange shade.

*Example 4*

7.2 parts of the hydrazone from quinoline-4-aldehyde and N-amino-2-methyl-indoline are dissolved with heating in 50 parts of toluene. 3.2 parts of dimethyl sulfate are added dropwise and the reaction mixture is stirred for 3 hours on a boiling water bath. The dyestuff which corresponds to the formula

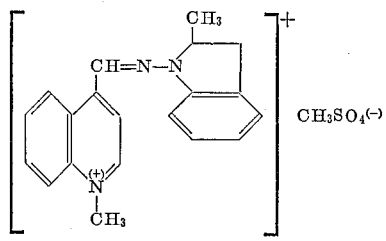

is separated in crystalline form and filtered off with suction after cooling and dried. For further purification the dyestuff is dissolved in 500 parts of water, the solution clarified with activated carbon, filtered off and the dyestuff salted out from the cooled filtrate with sodium chloride.

The dyestuff dyes yarns and fabrics of polyacrylnitrile a bluish red fast to light and wet processing. In mixed fabrics of polyacrylnitrile and wool the wool portion is not dyed.

If instead of quinoline-4-aldehyde quinoline-2-aldehyde, 8-nitro-quinoline-4-aldehyde, 6-nitro-quinoline-4-aldehyde, 6-chloro- or 6-bromo- or 6-methyl- or 6-methoxyquinoline-4-aldehyde are used and the process is otherwise carried out in the same manner, dyestuffs are obtained which dye materials of polyacrylnitrile a reddish orange, strongly reddish violet, reddish violet or bluish red with excellent fastness to light. If instead of dimethylsulfate methyliodide or benzyl chloride is used for quaternising the hydrazone obtained from chinoline-4-aldehyde and N-amino-2-methylindoline and the process is otherwise carried out in the same manner as indicated above, dyestuffs are obtained which dye materials of polyacrylnitrile red or bluish red.

*Example 5*

6.9 parts of acridine-9-aldehyde and 5.0 parts of N-amino-2-methyl-indoline are heated to the boil together with 30 parts of alcohol and kept boiling under reflux for 4 hours. On cooling the hydrazone dyestuff separates from the reaction solution which is filtered off with suction and recrystallised from dioxan. It melts at 189–190° C.

3.7 parts of the hydrazone are dissolved in a boiling mixture of 300 parts of water and 5 parts of concentrated hydrochloric acid. After clarifying the solution with activated carbon and filtering the dyestuff is salted out and the dyestuff salt is isolated.

The dyestuff dyes materials of polyacrylnitrile very fast reddish blue shade.

If instead of the N-amino-2-methyl-indoline the N-amino-hexahydrocarbazole is used a dyestuff is obtained which dyes polyacrylnitrile materials a bluish violet.

*Example 6*

4.0 parts of the hydrazone from acridine-9-aldehyde and N-amino-2-methylindoline are stirred for 10 minutes on a boiling water bath with 20 parts of toluene. 1.5 parts of dimethyl sulfate are then added dropwise and the reaction mixture is stirred on a boiling water bath for 3 hours. After the mixture has cooled the solvent is poured off from the solid residue, the latter dried in a vacuum and then dissolved in 300 parts of water. After the dyestuff solution has been clarified with activated carbon it is allowed to cool and the dyestuff is then separated by the addition of sodium chloride. The dyestuff thus obtained corresponds to the formula

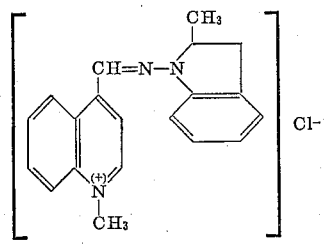

it dyes materials of polyacrylnitrile greenish blue shade of excellent fastness to light.

*Example 7*

38.1 parts of the azomethine dyestuff obtained by known methods from 1,2-dimethyl-benzthiazzolium methosulfate and p-nitroso-dimethyl aniline are heated with 200 parts of 10% hydrochloric acid on a boiling water bath until the blue-violet colour has disappeared. 13.9 parts of N-amino-2-methyl indoline are then added and the reaction mixture is heated on a boiling water bath for one hour. After the addition of activated carbon the dyestuff solution is filtered and the dyestuff is salted out from the cold solution. For further purification the dyestuff is dissolved in boiling water, the solution clarified with activated carbon and the dyestuff isolated from the cold filtrate.

The dyestuff dyes fabrics of cellulose acetate a reddish yellow of excellent fastness to light.

If instead of the N-amino-2-methyl-indoline the N-amino-hexahydrocarbazole is used and the process otherwise carried out in the same manner a dyestuff is obtained with which polyacrylnitrile fabrics can be dyed or printed yellow shade with excellent fastness properties.

*Example 8*

16.1 parts of pyridine-4-aldehyde are added to 20 parts of alcohol and 28.2 parts of N-amino-hexahydrocarbazole are subsequently introduced. The temperature rises hereby to 60° C. The reaction mixture is heated to the boil and maintained for 3 hours at this temperature. On cooling the hydrazone crystallises out. It is recrystallised from methanol and melts at 139–141° C.

13.9 parts of this hydrazone are dissolved with heating in 100 parts of toluene, and 7.5 parts of butyl bromide are added to the solution. The reaction mixture is subsequently heated to the boil, whereby the alkylated dyestuff of the formula

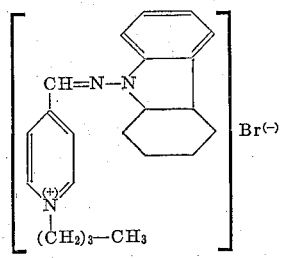

crystallises out. After boiling the mixture under reflux for 3 hours it is cooled and the dyestuff is isolated. For further purification the product is dissolved in 1000 parts of water, the dyestuff solution is clarified with activated carbon and the dyestuff is salted out from the cold solution.

The dyestuff thus obtained dyes materials of polyacrylnitrile reddish yellow shades with excellent fastness properties.

If instead of the pyridine-4-aldehyde the quinoline-2-aldehyde is used and the process otherwise carried out in the same manner, the corresponding hydrazone is first obtained which, after recrystallisation from ligroin, melts at 118–124°. The reaction of this hydrazone with dimethyl sulphate in the manner described above yields a dyestuff which dyes materials of polyacrylnitrile a reddish orange of excellent fastness to light.

*Example 9*

16.1 parts of pyridine-2-aldehyde are added to 20 parts of alcohol and this mixture treated with 28.2 parts of N-amino-hexahydrocarbazole, whereby the temperature rises to 57° C. The reaction mixture is heated to the boil and boiled under reflux for 3 hours. The alcohol is then distilled off in a vacuum and the residue dissolved in 500 parts of water and 20 parts of concentrated hydrochloric acid. After clarifying the dyestuff solution with activated carbon it is allowed to cool and the dyestuff salted out with sodium chloride.

The dyestuff dyes materials of polyacrylnitrile a greenish yellow of very good fastness properties.

If instead of the pyridine-2-aldehyde the quinoline-4-aldehyde is used and the process otherwise carried out in the same manner a dyestuff is obtained which dyes fabrics of polyacrylnitrile in reddish orange shades of very good fastness properties.

*Example 10*

20 parts of the dyestuff salt from pyridine-2-aldehyde and N-amino-hexahydrocarbazole are stirred together with 500 parts of water and the suspension is rendered alkaline with 60 parts of a 10% sodium carbonate solution. The dyestuff base is triturated with methanol and dried.

14.7 parts of this hydrazone are dissolved with heating in 50 parts of toluene. 7.3 parts of dimethyl sulfate are added dropwise and the reaction mixture heated to 100° C. After the reaction mixture is heated with stirring on a boiling water bath for 3 hours, it is allowed to cool and the toluene is poured off from the solid residue. The latter is dissolved in 500 parts of boiling water, the dyestuff solution is clarified with activated carbon and the dyestuff, after cooling the solution, salted out with sodium chloride.

The dyestuff dyes yarns and fabrics from polyacrylnitrile greenish yellow shade of very good fastness to light.

If instead of the dyestuff salt from pyridine-2-aldehyde and N-amino-hexahydrocarbazole the dyestuff salt from quinoline-4-aldehyde and N-amino-hexahydrocarbazole is used and the process otherwise carried out in the same manner, the dyestuff base of the hydrazone is first obtained, which, after recrystallisation from methanol, melts at 115–118° C. By the subsequent reaction with dimethyl sulfate, which is carried out in the manner described above, a dyestuff is obtained which dyes materials of polyacrylnitrile a very fast bluish red.

*Example 11*

20 parts of quinoline-2-aldehyde are dissolved, with heating, in 200 parts of ethanol and 24 parts of 9-aminocarbazole are added in portions to this solution. The reaction mixture is heated to 80° C. for 10 minutes. On cooling, the yellow hydrazone separates out which is filtered off with suction and recrystallised from benzene. It melts at 175–177° C.

20 parts of the hydrazone are suspended in 2800 parts of boiling water and 184 parts of concentrated hydrochloric acid are added. After 10 minutes the reaction mixture is allowed to cool and the crystallised dyestuff salt is then filtered off with suction. In order to purify it, it can be recrystallised from alcohol.

The dyestuff dyes materials of polyacrylnitrile a very fast strongly yellowish orange.

If instead of quinoline-2-aldehyde the pyridine-2-aldehyde is used a dyestuff is obtained which dyes polyacrylnitrile materials yellow shades.

Example 12

8 parts of the hydrazone from quinoline-2-aldehyde and 9-amino-carbazole are dissolved while warm in 60 parts of toluene and treated dropwise with 5 parts of dimethyl sulphate. The reaction mixture is heated for 15–20 minutes on a boiling water bath. A crystal paste separates which is filtered off with suction and, for purification, dissolved in 500 parts of water. The dyestuff solution is filtered through activated carbon and the dyestuff separated from the filtrate with sodium chloride. The dyestuff thus obtained dyes materials of polyacrylnitrile a yellowish orange with excellent fastness to light.

If instead of the quinoline-2-aldehyde the pyridine-2-aldehyde is used a dyestuff is obtained which dyes polyacrylnitrile materials yellow shades.

Example 13

12.6 parts of quinoline-2-aldehyde are dissolved, with heating, in 120 parts of ethanol and treated dropwise with 8 parts of N-amino-piperidine, and the mixture then heated to 80° C. for 2 hours. The reaction mixture is then diluted with water, the separated oil is dissolved in ether and the ether solution dried. After evaporating the solvent yellow crystals are obtained which, when recrystallised from ligroin, melt at 85–86° C.

2 parts of the hydrazone are suspended in 70 parts of boiling water and treated with 2 parts of concentrated hydrochloric acid. The product dissolves with a deepening in coloration. After 10 minutes the solution is allowed to cool and the dyestuff is separated with a little sodium chloride.

The dyestuff dyes polyacrylnitrile materials a greenish yellow with excellent fastness properties.

If instead of quinoline-2-aldehyde the acridine-9-aldehyde is used a dyestuff is obtained which dyes polyacrylonitrile fibres red shades with excellent fastness properties.

Example 14

21 parts of quinoline-4-aldehyde are boiled in 100 parts of ethanol together with 20 parts of N-aminotetrahydroquinoline, for one hour. Yellow crystals having a melting point of 196–198° C. (from benzene) are obtained. 10 parts of the hydrazone are dissolved in 200 parts of benzene and, after the addition of 5 parts of dimethyl sulfate, the mixture is boiled for 10–15 minutes. The separated oily dyestuff is dissolved in 300 parts of warm water, after decanting off the solvent, filtered through activated carbon and salted out from the filtrate with sodium chloride.

The dyestuff dyes materials of polyacrylnitrile a strongly reddish orange of excellent fastness to light.

If instead of quinoline-4-aldehyde pyridine-2-aldehyde, quinoline-2-aldehyde or acridine-9-aldehyde are used, dyestuffs are obtained which dye polyacrylnitrile materials a greenish yellow, yellowish orange or reddish violet with excellent fastness to light.

In the same manner a hydrazone is obtained from pyridine-4-aldehyde and N-amino-tetrahydro-isoquinoline which, after quaternising with dimethyl sulphate, yields a dyestuff which dyes polyacrylnitrile fabric a strongly reddish orange of very good fastness to light.

Example 15

15 parts of 5-nitro-1-amino-2-methyl-indoline, which is obtained by nitration of 1-acetylamino-2-methyl-indoline (M.P. 156–157° C.) and subsequent splitting off of the acetyl radical (M.P. 136–138° C.), are heated to the boil with 12 parts of quinoline-4-aldehyde in 140 parts of ethanol for 15 minutes. On cooling the hydrazone crystallises out.

18 parts of the hydrazone are dissolved in 150 parts of chlorobenzene, heated to the boil and treated dropwise with a solution of 7 parts of dimethyl sulphate in 50 parts of chlorobenzene. The dyestuff precipitates after a short time. It is filtered off with suction and dissolved, for purification, in 2000–3000 parts of water at 40–50° C. It is filtered through activated carbon and separated from the filtrate with sodium chloride.

The dyestuff dyes polyacrylnitrile fabrics orange shade with excellent fastness properties.

If instead of quinoline-4-aldehyde the quinoline-2-aldehyde is used and the process otherwise carried out in the same manner, a dyestuff is obtained which dyes polyacrylnitrile materials a strongly yellowish orange of excellent properties.

Example 16

15 parts of 1-amino-2-methylindoline-5-sulphonic acid dimethylamide are boiled together with 9.3 parts of quinoline-4-aldehyde in 200 parts of ethanol for 30 minutes. Yellow crystals are obtained which are used for quaternising without further purification.

16 parts of the hydrazone are dissolved, while warm, in 150 parts of chlorobenzene and treated dropwise with a solution of 6 parts of dimethyl sulphate in 50 parts of chlorobenzene, while stirring. The mixture is heated to the boil for 30 minutes. The dyestuff which corresponds to the formula

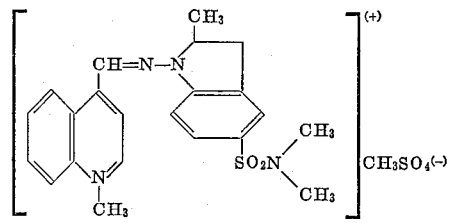

is thereby precipitated in a crystalline form which is then filtered off with suction and dissolved in 3000 parts of water, for purification. After filtration through activated carbon the dyestuff is separated from the filtrate with sodium chloride. It dyes yarns and fabrics of polyacrylonitrile in a strongly reddish orange with excellent fastness to light.

The 1-amino-2-methyl-indoline-5-sulfonic acid dimethylamide (M.P. 132–133° C.) is obtained by reacting 1-acetyl-2-methylindoline with chlorosulfonic acid to form 1-acetyl-2-methylindoline-5-sulfochloride (M.P. 142° C.); by reaction with dimethylamine 1-acetyl-2-methyl-indoline-5-sulfonic acid dimethylamide (M.P. 198–200° C.) is obtained therefrom, which is saponified with dilute mineral acid to give 2-methyl-indoline-5-sulfonic acid dimethylamide (M.P. 92–94° C.), This compound can be transformed in usual manner into 1-nitroso-2-methyl-indoline-5-sulfonic acid dimethylamide (M.P. 90–95° C.) from which 1-amino-2-methylindoline-5-sulfonic acid dimethylamide is formed by reduction.

Example 17

3.2 parts of 5-methoxy-1-amino-2-methylindoline are disolved in 5 parts of ethanol, treated with the solution of 3.1 parts of quinoline-4-aldehyde in 10 parts of ethanol and the mixture is heated for one hour under reflux. The hydrazone is precipitated from the reaction solution with 50 parts of water and washed several times by decanting with water and dissolved in 45 parts of toluene after drying thoroughly. After adding 2.3 parts of dimethyl sulphate the mixture is heated to the boil for one hour and the reaction mixture is then cooled to 0° C. The dyestuff is thereby precipitated. For purification, the separated substance is dissolved in 200–300 parts of water with the addition of a little acetic acid, the solution clarified by filtering it together with activated carbon and the dyestuff is subsequently separated from the filtrate in form of the perchlorate. It dyes polyacrylnitrile materials a reddish violet with very good fastness to light.

The 5-methoxy-1-amino-2-methyl-indoline (B.P. 104–125° C. at 1.2–2.0 mm. Hg) used is formed by the reduction of 5-methoxy-2-methyl-indole (B.P. 140–145° C. at 0.9–1.5 mm. Hg), treating the 5-methoxy-2-methyl-indoline (B.P. 82–109° C. at 0.7–1.0 mm. Hg) thus formed with nitrous acid and then transforming the nitroso into the amino group by known methods.

If instead of 5-methoxy-1-amino-2-methylindoline the 5-brom-1-amino-2-methylindoline, which was obtained in similar manner, is used and the process is otherwise carried out in the same manner a dyestuff is obtained, which dyes polyacrylnitrile fabrics red shade with very good fastness to light.

Example 18

4.2 parts of 1-amino-5-methoxy-2,3,3-trimethyl-indoline are dissolved in 10 parts of alcohol, treated with a solution of 4.2 parts of acridine-9-aldehyde in 44 parts of alcohol and the mixture is heated to the boil for 2 hours. After the addition of 3.3 parts of concentrated hydrochloric acid the mixture is heated for a further 15 minutes to 60–70° C. and then allowed to cool. After the addition of a little water the blue dyestuff salt crystallises out which is filtered off with suction and washed with a sodium chloride solution. The dyestuff dyes polyacrylnitrile fabrics a clear blue with excellent fastness properties.

The 1-amino-5-methoxy-2,3,3-trimethyl-indoline is obtainable by reduction of 5-methoxy-2,3,3-trimethyl-indoline to 5-methoxy-2,3,3-trimethyl-indoline (B.P. 112–117° C. at 1.6–1.9 mm. Hg) which can be transformed in the usual manner via 1-nitroso-5-methoxy-2,3,3-trimethyl-indoline (M.P. 53–54° C.) into the amino compound (B.P. 110–115° C. at 0.6 mm. Hg).

Example 19

2.6 parts of 1-amino-5-methoxy-2,3,3-trimethyl-indoline are dissolved in 7 parts of alcohol and 2.6 parts of acridine-9-aldehyde dissolved in 27 parts of alcohol are added, and the mixture is heated to the boil for 2 hours. The reaction mixture is freed from the solvent in a vacuum whereby the oily residue gradually crystallises.

1.3 parts of the hydrazone obtained are dissolved in 10 parts of chlorobenzene and treated with a solution of 0.5 part of dimethyl sulphate in 5 parts of chlorobenzene and the mixture is heated to the boil for one hour. On cooling the dyestuff crystallises out, which, after filtering off by suction, is dissolved in 90 parts of water, filtered through activated carbon and separated with sodium chloride. The compound dyes materials of polyacrylnitrile a clear greenish blue of excellent fastness properties.

If instead of the hydrazone from acridine-9-aldehyde and 1-amino-5-methoxy-2,3,3-trimethyl-indoline the hydrazone from quinoline-4-aldehyde, quinoline-2-aldehyde or 8-nitro-quinoline-4-aldehyde and 1-amino-5-methoxy-2,3,3-trimethyl-indoline is used and the process otherwise carried out in the same manner, dyestuffs are obtained which dye yarns and fabrics of polyacrylnitrile red-violet, reddish orange or bluish violet shades of excelent fastness properties.

Example 20

7.0 parts of 1-amino-2,3,3-trimethyl-indoline and 6.4 parts of quinoline-4-aldehyde are heated to the boil in 22 parts of ethanol for 2 hours. On cooling, yellow crystals are obtained which, recrystallised from alcohol, melt at 129–130° C.

8.9 parts of the hydrazone thus obtained are disolved in 30 parts of chlorobenzene and heated on a boiling water bath together with 3.7 parts of dimethyl sulphate for one hour. The dyestuff which corresponds to the formula

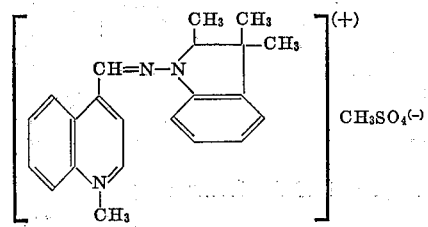

precipitated in a crystalline form is filtered off with suction, dissolved in 500 parts of water, the solution filtered through activated carbon and the dyestuff salted out with sodium chloride.

The compound dyes materials of polyacrylnitrile in red shades of excellent fastness to light.

In the preceding example the alcohol used is ethyl alcohol.

Example 21

20.3 parts of N-amino-2-methyl-indoline are added to the reaction product obtained from 36.6 parts of lepidinium methosulfate and 20.4 parts of p-nitroso dimethyl aniline; after addition of 292 parts of 10% hydrochloric acid the mixture is heated to 50–55° C. for 30 minutes. After adding activated carbon the dyestuff solution is heated to 80° C., filtered off and, after cooling the solution, the dyestuff is salted out with common salt.

The dyestuff obtained in this manner is identical with the product synthesized from chinoline-4-aldehyde and N-amino-2-methylindoline with subsequent quaternising as indicated in Example 4.

We claim:

1. A dyestuff of the formula

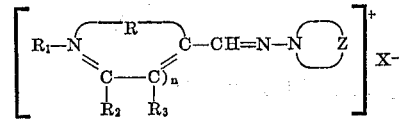

wherein $n$ is 1; R— is a divalent radical which together with

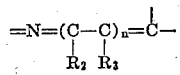

forms a heterocyclic moiety selected from the class consisting of pyridine, quinoline and acridine rings, said moiety being attached to the

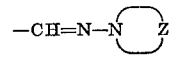

group through the ring carbon atom; $R_2$ and $R_3$ standing for members selected from the class consisting of hydrogen and, when taken together, represent the atoms necessary to complete a phenylene nucleus; $R_1$ is a member selected from the class consisting of hydrogen, benzyl and lower alkyl; Z represent the atoms necessary to complete a nitrogenous heterocyclic nucleus selected from the group consisting of a carbazole, hexahydrocarbazole and indoline; and $X^-$ is an anion.

2. The dyestuff of the formula

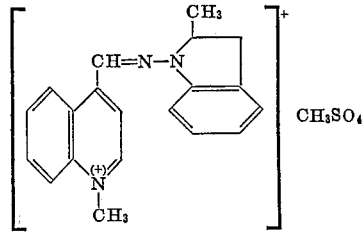

3. The dyestuff of the formula

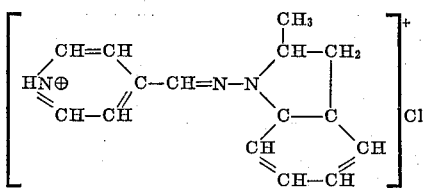

4. The dyestuff of the formula

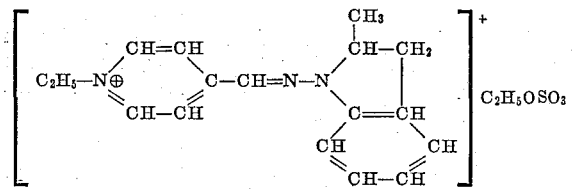

5. A dyestuff of the formula

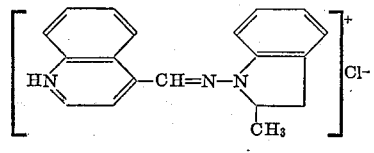

6. A dyestuff of the formula

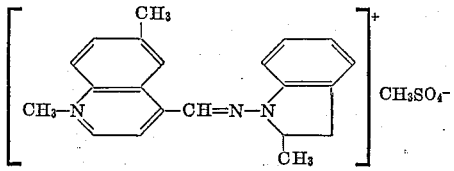

7. A dyestuff of the formula

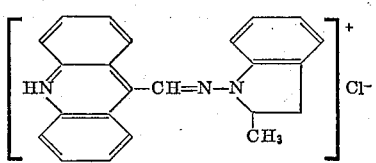

8. A dyestuff of the formula

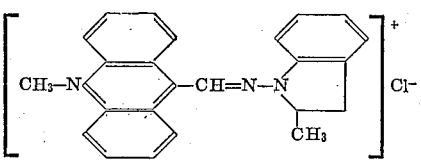

9. A dyestuff of the formula

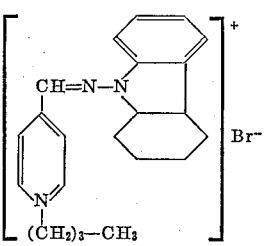

10. A dyestuff of the formula

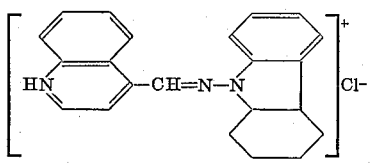

11. A dyestuff of the formula

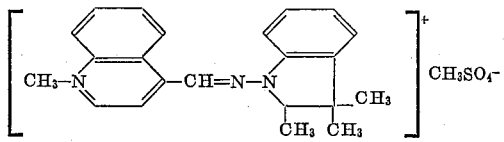

References Cited by the Examiner

UNITED STATES PATENTS

| | | | |
|---|---|---|---|
| 2,767,174 | 10/1956 | Katz et al. | 260—240 |
| 2,906,588 | 9/1959 | Brunkhorst et al. | 260—240 XR |
| 2,932,646 | 4/1960 | Biel | 260—294.7 |
| 3,051,707 | 8/1962 | Biel | 260—247.5 |

FOREIGN PATENTS 206,549   12/1959   Australia.

WALTER A. MODANCE, *Primary Examiner.*

DUVAL T. McCUTCHEN, IRVING MARCUS,
*Examiners.*